United States Patent
Pesarchick (10) Patent No.: US 12,056,749 B1
(45) Date of Patent: Aug. 6, 2024

(54) CUSTOMIZED APPAREL PROCUREMENT METHOD

(71) Applicant: Sheila E. Pesarchick, Strongsville, OH (US)

(72) Inventor: Sheila E. Pesarchick, Strongsville, OH (US)

(*) Notice: Subject to any disclaimer, the term of this patent is extended or adjusted under 35 U.S.C. 154(b) by 1117 days.

(21) Appl. No.: 16/412,652

(22) Filed: May 15, 2019

Related U.S. Application Data (63) Continuation-in-part of application No. 15/851,641, filed on Dec. 21, 2017, now abandoned, and a continuation-in-part of application No. 15/609,054, filed on May 31, 2017, now abandoned, and a continuation-in-part of application No. 13/897,754, filed on May 20, 2013, now abandoned.

(51) Int. Cl.
| | | |
|---|---|---|
| *G06Q 30/00* | (2023.01) | |
| *G06F 3/04815* | (2022.01) | |
| *G06F 3/04845* | (2022.01) | |
| *G06Q 30/0601* | (2023.01) | |
| *G06T 15/00* | (2011.01) | |
| *G06F 3/0482* | (2013.01) | |

(52) U.S. Cl.
CPC ..... *G06Q 30/0621* (2013.01); *G06F 3/04815* (2013.01); *G06F 3/04845* (2013.01); *G06Q 30/0643* (2013.01); *G06T 15/00* (2013.01); *G06F 3/0482* (2013.01); *G06T 2200/24* (2013.01); *G06T 2210/16* (2013.01); *G06T 2215/16* (2013.01)

(58) Field of Classification Search
CPC ............ G06Q 30/0621; G06Q 30/0643; G06F 3/04815; G06F 3/04845; G06T 15/00
USPC ........................................................ 705/26.5
See application file for complete search history.

(56) References Cited

U.S. PATENT DOCUMENTS

| | | | |
|---|---|---|---|
| 6,901,379 B1 | 5/2005 | Balter et al. | |
| 6,968,075 B1 * | 11/2005 | Chang | G06K 9/00214 382/111 |
| 8,229,799 B2 | 7/2012 | Singhal | |
| 8,321,301 B2 | 11/2012 | Manea et al. | |
| 9,366,530 B2 | 7/2016 | Wilinson et al. | |
| 9,623,578 B1 | 4/2017 | Aminpour et al. | |
| (Continued) | | | |

OTHER PUBLICATIONS

Lim, H. S. (2009). Three dimensional virtual try-on technologies in the achievement and testing of fit for mass customization (Order No. 3377587). Available from ProQuest Central; ProQuest Dissertations & Theses Global. (304965651). (Year: 2009).*

(Continued)

*Primary Examiner* — Arielle E Weiner
(74) *Attorney, Agent, or Firm* — Gugliotta & Gugliotta LPA (57) ABSTRACT

A method for the on-line "off the rack" and/or customization, purchasing and delivery of uniquely designed clothing and accessories is provided. An integrated system allows for sizing, selection, visualization, procurement, manufacturing and delivery of apparel and fashion items uses an online system that interfaces with customers, designers and suppliers. A digitized virtual replica of a customer's unique body is graphically displayed with specific styles and design of apparel or fashion accessories. Images of the specific apparel are visualized, modified and compared electronically prior to final selection and procurement. Selection allows comparison of existing inventory with custom manufacturing of a customized and custom sized item, thereby optimizing the supply chain while minimizing returned purchase.

13 Claims, 8 Drawing Sheets

(56) References Cited

U.S. PATENT DOCUMENTS

| | | | |
|---|---|---|---|
| 2002/0138170 A1* | 9/2002 | Onyshkevych | G06Q 30/06 |
| | | | 700/130 |
| 2003/0110099 A1 | 6/2003 | Trajkovic et al. | |
| 2007/0198120 A1* | 8/2007 | Wannier | G06Q 30/06 |
| | | | 700/138 |
| 2012/0086783 A1 | 4/2012 | Sareen | |
| 2012/0091627 A1 | 4/2012 | Schibsbye | |
| 2013/0054425 A1 | 2/2013 | Potelos et al. | |
| 2013/0299912 A1 | 11/2013 | Kim et al. | |
| 2014/0277683 A1* | 9/2014 | Gupta | A41H 3/007 |
| | | | 700/132 |
| 2015/0106241 A1* | 4/2015 | Lucido | G06F 3/014 |
| | | | 705/27.2 |

OTHER PUBLICATIONS

Ref U Continued: Retrieved from https://www.proquest.com/dissertations-theses/three-dimensional-virtual-try-on-technologies/docview/304965651/se-2 (Year: 2009).*

[TC]2 Announces Major Breakthrough in 3D Full Body Scanning, Press Release.

"Outsourcing decisions in reverse logistics: Sustainable balanced scorecard and graph theoretic approach", Agrawal et al (Jan. 7, 2016).

"Sustainable reverse supply chains and circular economy in multi-channel retail returns" Frei et al. (Jan. 29, 2020).

"Shipping fee schedules and return behavior" Lepthien et al (Apr. 11, 2019).

* cited by examiner

CUSTOMIZED APPAREL PROCUREMENT METHOD

RELATED APPLICATIONS

The present application is: a Continuation in Part of U.S. Ser. No. 13/897,754, filed on May 20, 2013; a Continuation in Part of U.S. Ser. No. 15/609,054, filed on May 31, 2017; and, a Continuation in Part of U.S. Ser. No. 15/851,641, filed on Dec. 17, 2017. There are no previously filed, nor currently any co-pending applications, anywhere in the world.

BACKGROUND OF THE INVENTION

1. Field of the Invention

The present invention relates to a system and method for the procurement of apparel items and, more particularly, to include virtualizing the apparel item prior to procurement and customization and online delivery of procured apparel items.

2. Description of the Related Art

Before the industrial revolution, clothing, as with many commercially produced articles, were made individually to fit the application. However, in order to create efficiencies associated with mass production, standard clothing "sizes" were identified and utilized. This is possible since the range of human body dimensions is relatively small. However, a range does still exist, and this can cause standard "sizes" to have an unacceptable fit to many individuals.

Clothing size refers to the label sizes used for garments sold "off-the-rack." For purposes of the present disclosure the term "off-the-rack" can be broadly construed as those clothing items that are premade for inventory or made to a particular standard without having any specific wearer predetermined. For further purposes of the present disclosure, "off-the-rack" can be considered to be any garment that is not custom fabricated to a particular user's dimension, such as with custom tailored clothing. Even considering all the various channels of pre-fabricated and inventoried apparel items, there are still a large number of standard sizing systems around the world for various garments, such as dresses, tops, skirts, and trousers. Standard sizes take into account the combinations of body measurements of the general population, and include:

- Horizontal torso measurements such as the neck circumference, the shoulder width, the bustline measurements, over-bust circumference, the full bust circumference, the bust-point separation, and the under-bust (ribcage) circumference, the natural waist circumference, the upper hip circumference and the lower hip circumference;
- Vertical torso measurements such as the back (neck-waist) length, the shoulder-waist length (not the same as the back length, due to the slope of the shoulder), the bust-shoulder length, the bust-waist length, and the two hip-waist lengths; and
- Sleeve measurements such as the under-arm and over-arm lengths, the fore-arm length, the wrist circumference and the biceps circumference.

Given these degrees of dimensional variation, the International Organization for Standardization (ISO) has developed several standards related to size designation of clothes. These include:

- ISO 3635:1981 Size designation of clothes—Definitions and body measurement procedure;
- ISO 4416:1981 Size designation of clothes—Women's and girls' underwear, nightwear, foundation garments and shirts;
- ISO 5971:1981 Size designation of clothes—Pantyhose;
- ISO 8559:1989 Garment construction and anthropometric surveys—Body dimensions;
- ISO/TR 10652:1991 Standard sizing systems for clothes; and
- European Union standard EN 13402, intended to replace existing standards in the member countries. This is not yet in common use.

Further, the United Kingdom has an existing standard for women's clothing (i.e. BS 3666:1982), which defines sizes in terms of hip and bust measurements only within a limited range. However, this standard is rarely utilized.

This has resulted in variations between manufacturers. For example, the dimensions of two size 10 dresses from different companies, or even from the same company, may have grossly different dimensions; and both may also be different in dimension that than the size 10 dimensions described in the US standard.

The new European Standard EN 13402, not yet in use, seeks to address such problems. However, there is no single clothing size standard in the U.S. or worldwide. Further, because of the drape and ease of the fabric, not all measurements are required to obtain a well-fitting garment in some styles.

Further still, while statistical data about the distribution of body dimensions in the population can be obtained in order to optimize product sizes, changes in life styles, nutrition and ethnic composition of populations and other variables lead to changes in the distribution of body dimensions and still require regular updating of anthropometric data collections.

Consequently, there exists problems for most individuals who wish to obtain a well-fitting garment, and especially for women and professional women (in which business attire has, customarily, more restrictions in styles) given the greater variability in female sizes and body types. This is why most people will need to engage in a test wearing of a garment in order to determine if its fit is acceptable. Most clothiers will have a fitting room for this purpose. However, this necessity of "test wearing" of a garment prior to procurement is a major barrier in allowing for the efficiencies that can be enabled in the web-based facilitation of the sales and distribution of apparel. With made-to-order garments requiring measurements to be taken, web-based procurement can be used; however, with such custom tailoring the advantages of mass production are subsequently lost.

It is thus an object of the present invention to provide a method of enabling the procurement of custom fitted apparel utilizing on-demand manufacturing techniques in which apparel items are specifically fitted to the individual purchaser, but in a manner that maintains efficiencies of today's demand-manufacturing facilities.

It is also an object of the present invention to allow for in the incorporation of new technology developments in the retailing of clothing and apparel.

It is a further object of the present invention to provide a standardized method of gathering an individual customer's body dimensions (within a tolerance) to allow for the manufacturing of a specifically fit garment.

It is still a further object of the present invention to provide a system and method for shopping for attire that can minimize the need for inventorying pre-manufactured items in incremental and standard sizes.

It is still a further object of the present invention to provide for the procurement of apparel that can effectively utilize any traditional sizing method of the type that conventionally can vary widely across brands and that do not fit a significant element of the population.

It is still a further object of the present invention to provide for an exact virtual replica (within a tolerance), or animated 3D virtual rendering of a shopper's exact body dimensions (within a tolerance) in a virtual fitting room. Such a virtualized rendering can allow the shopper to visualize the appearance of a selected item of apparel without the need to "test wear" such items physically.

It is yet another object of the present invention to provide for on-line automated purchasing of clothing that matches the purchaser's exact virtual replica (within a tolerance), along with the both "off-the-rack" and on-demand manufacturing of that exact purchase.

Further still, it is an object of the present invention to provide for a purchaser to have a capacity to visualize an "off-the-rack" garment as it exists, or as would be modified through alterations, or dimensioned as a fully customize apparel item prior to online procurement.

Consequently, a need has been felt by women and especially professional women for the implementation of demand manufacturing of custom fabricated apparel items in conjunction with the online selection and review systems in order to enable an apparel procurement system that can facilitate the efficient identification, manufacture, and distribution and delivery of individually fitted apparel.

SUMMARY OF THE INVENTION

In general terms, the present invention is directed to the on-line visualization, customization, purchasing and delivery of off-the-rack or uniquely designed clothing and accessories. In one possible configuration and by non-limiting example, an integrated system for the sizing, design, selection, visualization, procurement, manufacturing and ultimate delivery of apparel and fashion items is provided through the use of an online system that interfaces with individual customers, various designers and suppliers, as well as manufacturing elements capable of on-demand manufacturing utilizing the sharing of data and information gathered from each of these participants. The customer's unique body measurements (within a tolerance) are captured for implementation by an exact scale virtual replica (within a tolerance, i.e., animated "3D Virtual You") with specific styles and design of apparel or fashion accessories. Images of the specific apparel can then be visualized electronically in either off-the-rack sizing (and procured "as-is"), with standard alterations, or as custom manufactured prior to final selection and procurement. Once final selection and procurement is completed, either for "off the rack" garments to be purchased "as is" or those custom sized selections provide for the entire information packet of style, design, dimension, and all other information necessary for manufacturing to be delivered to a facility for on-demand manufacturing of a customized and custom sized item for immediate manufacture and delivery to the purchaser.

One aspect of the present invention is the use of a "best fit" element for the identification and capture of a customer's unique body dimensions (within a tolerance). In a preferred embodiment, the acquisition of customer body dimension information may be captured through the use of three-dimensional (3D) imaging. It is anticipated that the dimensional 3D image may be used to generate a graphical representation or image of the user, also known as a computer "Virtual You" that embodies, in a visual manner, the exact body dimension information within a precision of +/−0.5 cm of each dimension. This "Virtual You" may then be used to implement a virtual fitting room that allows for a shopper to visualize the appearance of a selected item of apparel without the need to view themselves while physically wearing the selected item. The virtualized image can be shown with existing standard apparel selections, as well as those selections as they would appear with standard alterations or, in the alternative, as a fully custom fit construction. This "Virtual You" may also be used as an information envelope into which other information is added including, but not limited to, apparel style information (i.e. size, dimension, cut, fabric, etc.) as well as apparel manufacturing details (i.e. horizontal torso measurement, vertical torso measurements, sleeve measurements, etc.) for transmission to and use by a manufacturing facility.

The "best fit" data acquisition and imaging may be accomplished by various methods. Data acquisition service providers may be available from retail locations, such as in addition to or in place of traditional retailer fitting rooms. Or, contract locations for scanning services may be formed to provide such best fit imaging on a contract basis. Further still, "Virtual You" generation may be accomplished through the use of a home body scanning system, a mobile device implemented scanning system or application, or even by inputting and transmitting conventional tailoring measurements.

Another aspect of the present invention is the incorporation of, or access to, apparel design selections capable of customized implementation by an individual user. Used as a platform by consultants and fashion designers for distribution of their content, users can have the opportunity to customize these third-party designer fashions for their particular size and use. Similar "Virtual You"-like images of such designs can be manipulated and merged with the user's "Virtual You" to provide a virtual dressing room for user approval. Further still, customized fashion elements or third party provided fashions capable of being modified can further provide a user with a variety of fashion selections and can even enable users to develop derivative fashion works. Customization of the apparel item by the user can range from mere modification of small parts of existing designs as enabled by standard alteration techniques, or all the way through the creation of a completely unique apparel item all together. In conjunction with a simplified design software program that facilitates use by any client online, unique modifications or combinations of designs allow a user to customize their own creation on their "Virtual you", and provide the ability to duplicate any design from a photo online by simply importing the photo into a conversion engine. Such a design may be recreated on the "Virtual You" to the exact measurements where modifications may then be made by the client based on her preferences.

Yet another aspect of the present invention is an interface with custom clothing manufacturers to provide fulfillment. Traditional clothing manufacturing methods or fulfilment channels may be used. Also, "demand" or real time manufacturing can be used. By taking the "Virtual You" size specification, along with fabric and design details such as fabric types and colors, an assembly package can be digitally transmitted to a manufacturing facility for immediate production of the apparel. Whether using conventional manufacturing equipment, specialized manufacturing equipment, or a professional tailor, a uniquely sized and designed apparel product may be manufactured immediately upon completion of the sizing and selection process. This provides an optimal fit for the consumer with a production process that optimized the use of existing inventory of completed product.

Still another aspect of the present invention is the access to and integration of an online retail application. In a preferred embodiment, the online retail application may be the primary customer interface for accessing "off the rack" sizing, selecting styles and designs, viewing "Virtual You" based virtual fittings, and eventually procurement finalization and payment.

A final aspect of the present invention is the creation of user community participation. This participation may include a broad range of activities, from user feedback on purchases, styles or designs, to commissioning of custom designs of particular designers.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The logical operations of the various embodiments of the invention described herein are implemented as: (1) a sequence of computer implemented operations running on a computing device; and/or (2) interconnected machine modules within the computing device. Modules represent functions executed by program code such as commonly available programming languages. The implementation used is a matter of choice dependent on the performance requirements of the particular programmable device and associated computing devices. Accordingly, the logical operations making up the embodiments of the invention described herein can be referred to alternatively as operations, modules, and the like.

Figure 1:
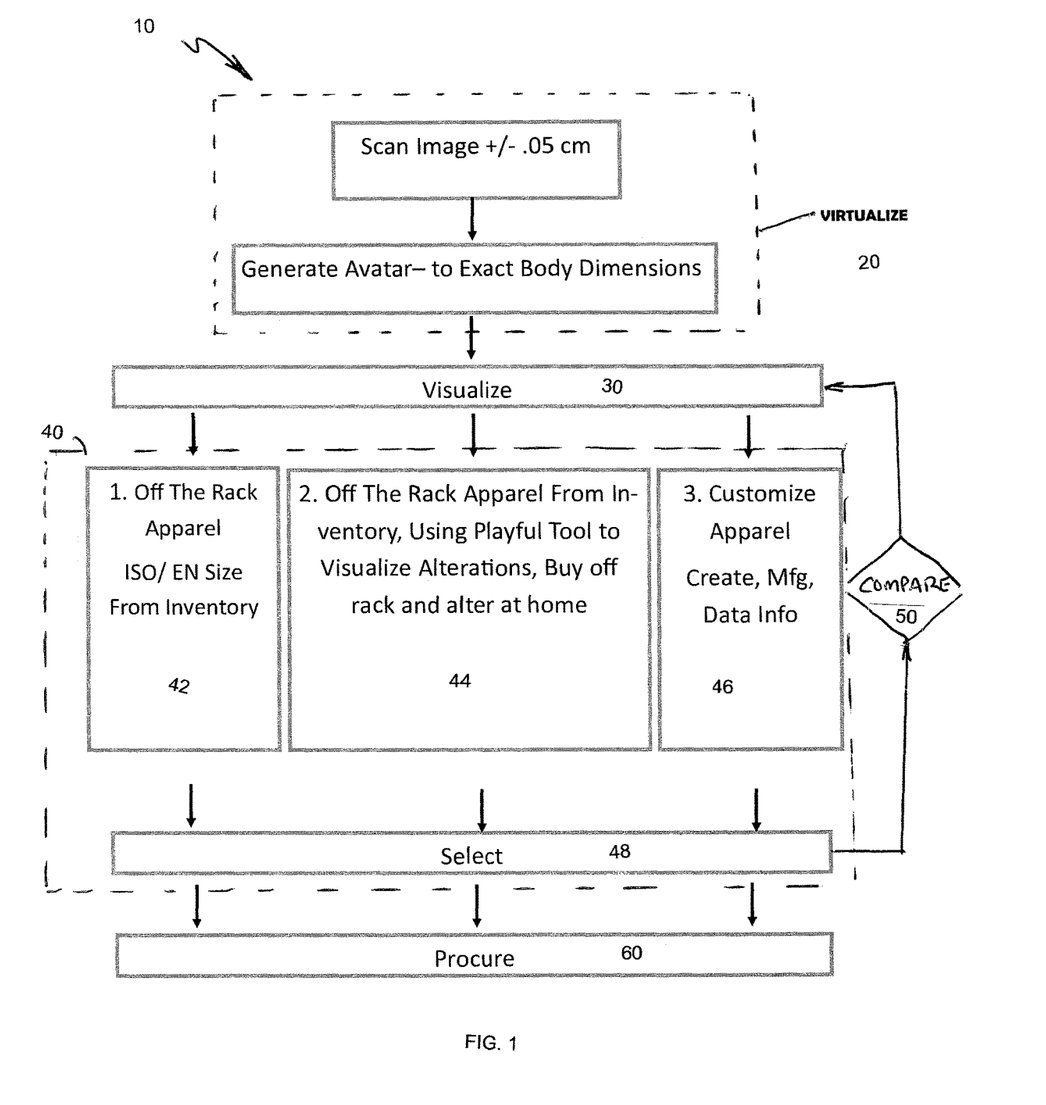
FIG. 1 is a schematic block diagram of a method for facilitating online retail procurement of apparel, fashion or clothing items comprising.

Referring now to FIG. 1, a schematic block diagram shows an overall method, generally noted as 10, for facilitating online retail procurement of apparel, fashion or clothing items according to the preferred embodiment of the present invention. The method 10 addresses the necessity of "test wearing" of a garment prior to procurement in a manner that facilitates web-based sales or distribution in a manner that eliminates, or at least minimizes, conventional methods that require returning ill-fitting or errantly selected apparel. The method 10 consists essentially of four steps: virtualizing a user's exact body dimensions 20 (within a tolerance); visualizing the virtualized image with or without an apparel selection 30; "shopping" through selections of apparel, fashion or clothing items 40; comparing differential visualized selections 50; and procuring 60.

Virtualizing a user 20 may be accomplished by scanning a user's body dimension information in a manner that that corresponds to exact body dimensions within a certain precision. While many levels of precision may be sufficient, it is felt that an accuracy of within about +/−0.5 cm may be sufficient. The virtualized user image may be presented as a scale avatar image of the user in a manner described in greater detail below.

Visualization 30 of a scale image having the user allows a graphical representation or image of the user that embodies, in a visual manner, the exact body dimension (within a tolerance) information. As described in greater detail below, such exact scale image visualization allows an on-line "test wearing" of a garment in a manner that will eliminate, or at least minimize, the two major problems currently plaguing on-line sales of clothing items: user hesitation to purchase; and, a high rate of return or exchange of received items. The core to both of these problems stem from the need for most shoppers to actually wear the apparel item in order to determine adequate fitment or for a user's determination of appearance wearing the item.

"Shopping" through selections of apparel, fashion or clothing items 40 allows for a user to select from an apparel database that stores a plurality of apparel, fashion or clothing design element information. The shopping step is intended to accommodate "off-the-rack" apparel that exists from inventory. The shopping step is further intended to accommodate custom manufactured apparel.

Comparing differential visualized selections 50 is intended to allow a user to compare existing inventory 42 as it may appear on the individual user to custom manufacture apparel 46. Further, a user may be able to visualize alterations 44 of the off-the-rack apparel. By allowing the selection 48 of such different sources of apparel in a common comparison 50, a supply chain may be better optimized.

The comparison of a pre-sized apparel from a predetermined sized of existing inventory will allow procurement 60 to occur with greater certainty and minimize the barriers that currently exist in implementing web-based facilitation of the sales and distribution of apparel. With made-to-order garments requiring measurements to be taken, web-based procurement can be used; however, with side by side comparison with existing inventory a user can better compare the advantages of selecting custom tailoring of on-demand manufactured items.

Figure 2:
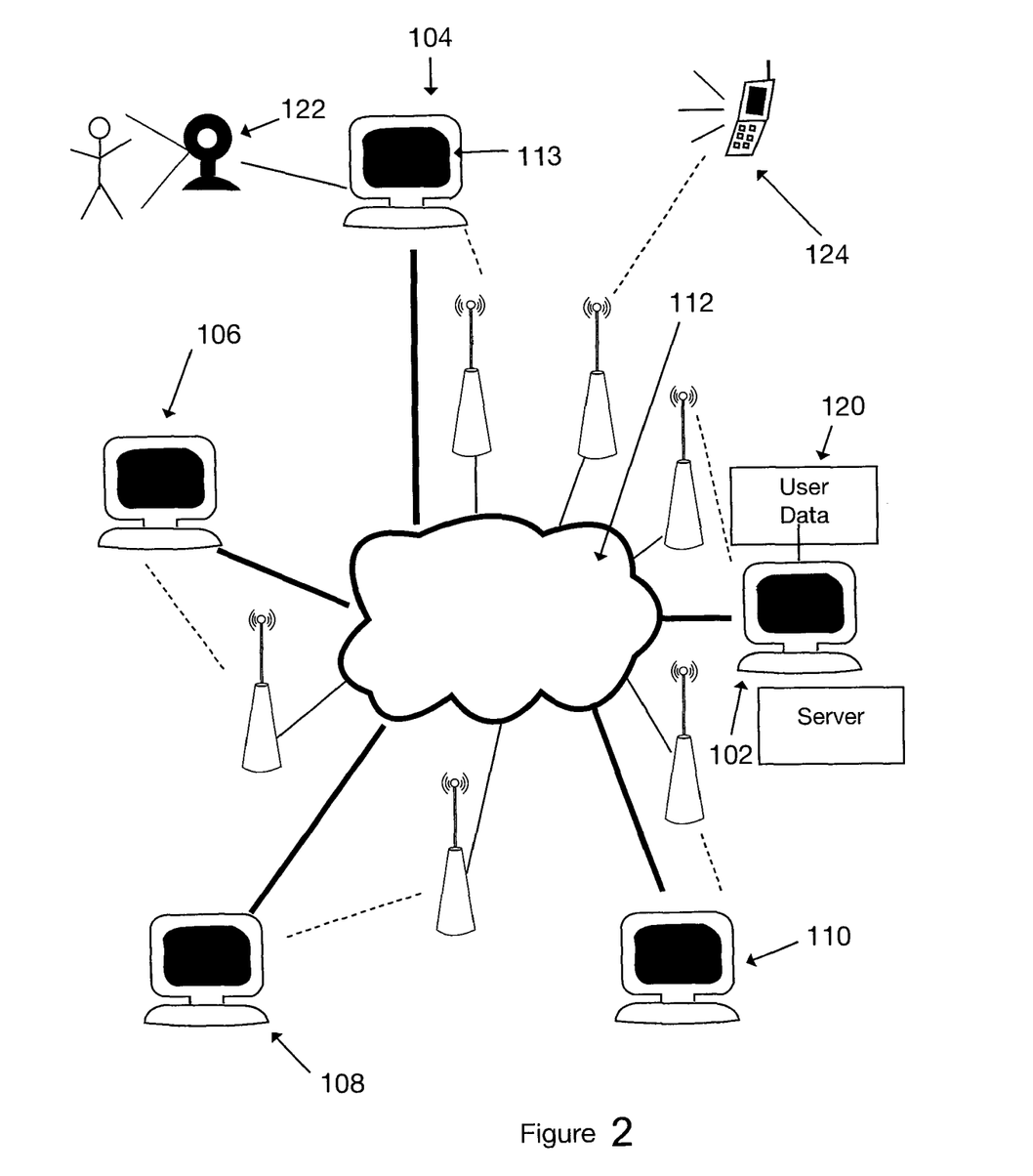
FIG. 2 is a schematic block diagram of an exemplary customized apparel procurement system according to the present disclosure.

Referring now to FIG. 1, a schematic block diagram of an exemplary customized apparel procurement system 100 is shown. System 100 includes server 102, imaging computing system 104, designer computing system 106, manufacturer computing system 108, and user computing system 110. In some embodiments communication occurs across network 112. Server 102 includes user "Virtual You" size and manufacturing data 120. Imaging scanners for obtaining user 3D imaging and dimensions 122 and 124 are in informational communication or coupled to the imaging computing system 110 and/or to the network 112 directly through portable communication devices, respectively.

Briefly, some embodiments of customized apparel procurement system 100 operate to provide quick and convenient access to user "Virtual You" size and manufacturing data 120, while protecting the "Virtual You" size and manufacturing data 120 from unauthorized access. For example, imaging, size and manufacturing date for a particular user (generally referred to as a "clothing shopper" herein) are stored in user data 120 of server 102. One aspect of the present invention is the creation of a "best fit" element as part of the user data 120 for the clothing shopper. This data incorporates the identification and capture of a customer's unique body dimensions through the acquisition of customer's body dimension (within a tolerance) information as captured through the use of three-dimensional (3D) imaging and communicated to the imaging computing system 104. It is anticipated that the dimensional, animated 3D image may be used to generate a graphical representation or image of the user, also known as a computer "Virtual You" 113, which embodies, in a visual manner, the exact body dimension (within a tolerance) information. This "Virtual You" 113 is transferred to the user size and manufacturing data 120 on the server 102 by communication over the network 112. The "best fit" data acquisition and imaging may be accomplished by various methods, such as through 3D body scanners 122 in electronic or wireless communication with the imaging computing system 104, or directly through the network 112 via electronic or wireless communication with a portable mobile device 124. The 3D body scanner 122 may be implemented through third party or distributed data acquisition services available from retail locations. By way of example, and not as a limitation, a portable scanning system such as the Spacevision Cartesion portable body scanner as provided by [TC]² may provide a remotely locate 3D body scanner to provide remotely located, full body commercial body scanning. [TC]² corporation, located in Cary, NC, provides can provide high-fidelity, accurate, realistic "Virtual You"s created from body scan data, or through the use of [TC]²'s "Virtual You" engine with the input of a few basic measurements. Other similar or equivalent 3D body scanning systems are further provided by: Vitronic of Wiesbaden, Germany; Styku of Los Angeles, CA; Size Stream of Cary, NC; Poikos of Birmingham, UK; or Fit3D of Redwood City, CA. The measurement extraction software package features capabilities for Virtual Fashion visualization with links to 3D garment content from major industry CAD packages. Other scanning technologies can be incorporated and implemented, such as one similar to that of Made-To-Order Swimwear (http://loricoulter.com) provided by Lori Coulter, LLC of St. Louis, MO, or Tailored For You, Ltd of Swindon, England (http://www.tfycollections.co.uk/). Other apparel size scanning system also exist, such as Me-Ality (http://www.uniqueltd.com or http://www.me-ality.com) can be used in addition to or in place of traditional retailer fitting rooms. Further still, "Virtual You" generation may be accomplished through the use of a home body scanning system through a mobile device implemented scanning system or application 124 communicated directly to the network 112.

The "Virtual You" 113 is used as an information envelope into which other information is added including, but not limited to, apparel style information (i.e. size, dimension, cut, fabric, etc.) as well as apparel manufacturing details (i.e. horizontal torso measurement, vertical torso measurements, sleeve measurements, etc.) for transmission to and use by a manufacturing facility. The information envelope will include or will facilitate pattern information required to make the design complete for final cutting and sewing.

Some embodiments of customized apparel procurement system 100 include some or all of the following.

Server 102 is a computing system that stores or is able to access customer data 120. Server 102 is in data communication with network 112. In some embodiments server 102 is a Web server that generates data for one or more web pages. The data is communicated across network 112 to a computing system operating a browser software application. An example of server 102 is described with reference to FIG. 2.

In some embodiments server 102 stores customer data 120 in memory of server 102. In other embodiments, customer data 120 is stored remotely from server 102, but is accessible to server 102, such as across network 112 or another network. In some embodiments customer data 120 is stored in a database or other data record.

Customer data 120 includes information relating to a particular customer. Examples of customer data include body element sizes and dimension that correspond to standard sizing systems around the world for various garments, such as dresses, tops, skirts, and trousers. Standard sizes take into account the combinations of body measurements to and include horizontal torso measurements, vertical torso dimensions, or sleeve measurements in a fashion to allow for the coordination of the manufacturing of a particular garment item. Horizontal torso measurements may include the neck circumference, the shoulder width, the bustline measurements, over-bust circumference, the full bust circumference, the bust-point separation, and the under-bust (rib-cage) circumference, the natural waist circumference, the upper hip circumference and the lower hip circumference. Vertical torso measurements may include the back (neck-waist) length, the shoulder-waist length (not the same as the back length, due to the slope of the shoulder), the bust-shoulder length, the bust-waist length, and the two hip-waist lengths. Sleeve measurements may include the under-arm and over-arm lengths, the fore-arm length, the wrist circumference and the biceps circumference. Other dimensions can be included that conform any standards, such as one or more standards from the International Organization for Standardization (ISO) or European Standards (EN) requirements.

In some embodiments, imaging computing system 104 communicates wirelessly with network 112. Examples of imaging computing system 104 that communicates wirelessly with network 112 include a laptop computer, a handheld computing system, a tablet computer, a personal digital assistant (PDA), a cell phone, and other computing systems. In some embodiments imaging system 104 is a remote mobile computing system. In some embodiments, designer computing system 106 includes a wireless communication device. Examples of wireless communication devices include a radio transceiver, cell phone, wireless modem, satellite communication system, infrared communication system, and other communication systems that communicate using electromagnetic waves.

In some embodiments, communication of customer data 120 is performed in accordance with a secure data communication protocol, such as Secure Sockets Layer (SSL).

Imaging computing system 104 is a computing system that operates to allow the acquired scanned body image data, as described above, to be communicated to the customer data on server 102. In some embodiments system 104 is the same as server 102, but typically system 104 is a separate computing system. Image computing system 104 is typically operated by person performing as data acquisition service and may be available from retail locations, such as in addition to or in place of traditional retailer fitting rooms. Imaging computing system 104 may also be contract locations for scanning services to provide such fit measurement imaging on a contract basis.

The designer computing system 106 is a computing system associated with a system for use by consultants and fashion designers for inclusion and distribution of their content for access by users. In some embodiments, designer computing system 106 communicates wirelessly with network 112. Designer computing system 106 is typically operated by a third-party fashion or clothing designer to provide customized fashion elements or third party provided fashions capable of being modified. Additionally, designer computing system 106 can be a number of different such designers and can further provide a user with a variety of fashion selections as well as even enable user to develop derivative fashion works for their particular size and use. Similar "Virtual You"-like images of such designs are manipulated and merged with the user's "Virtual You" 113 to provide a virtual dressing room for user approval. Further still, examples a designer computing system 106 that communicates wirelessly with network 112 include a laptop computer, a handheld computing system, a tablet computer, a personal digital assistant (PDA), a cell phone, and other computing systems. In some embodiments designer computing system 106 is a remote mobile computing system. In some embodiments, communication of customer data 120 is performed in accordance with a secure data communication protocol, such as Secure Sockets Layer (SSL).

In some embodiments, designer computing system 106 includes a wireless communication device. Examples of wireless communication devices include a radio transceiver, cell phone, wireless modem, satellite communication system, infrared communication system, and other communication systems that communicate using electromagnetic waves.

Manufacturing computing system 108 is a computing system located in a clothing manufacturing facility, such as a conventional apparel manufacturing facility. Manufacturing computing system 108 is in data communication with network 112. Manufacturing computing system 108 may also be used by a custom clothing manufacturer to provide finished product fulfillment. Traditional clothing manufacturing methods may be used. Also, "demand" or real time manufacturing can be used. By taking the "Virtual You" size specification, along with fabric and design details such as fabric types and colors, an assembly package can be digitally transmitted back from the customer data 120 on the server 102 to a manufacturing facility for immediate production of the apparel. Whether using conventional manufacturing equipment, specialized manufacturing equipment, or a professional tailor, a uniquely sized and designed apparel product may be manufactured immediately upon completion of the sizing and selection process.

Customer computing system 110 is a computing system typically operated by customer, such as at the customer's home or office. However, in some embodiments the customer computing system 110 is a mobile device, such as a laptop computer, cell phone, personal digital assistant, or other computing systems. In some embodiments customer computing system 110 operates to communicate data across network 112, such as to access customer data 120 for purposes of access to and integration of an online retail application. The online retail application may function as the primary customer interface for accessing sizing, selecting styles and designs, viewing "Virtual You" based virtual fittings, and eventually procurement finalization and payment.

Figure 3:
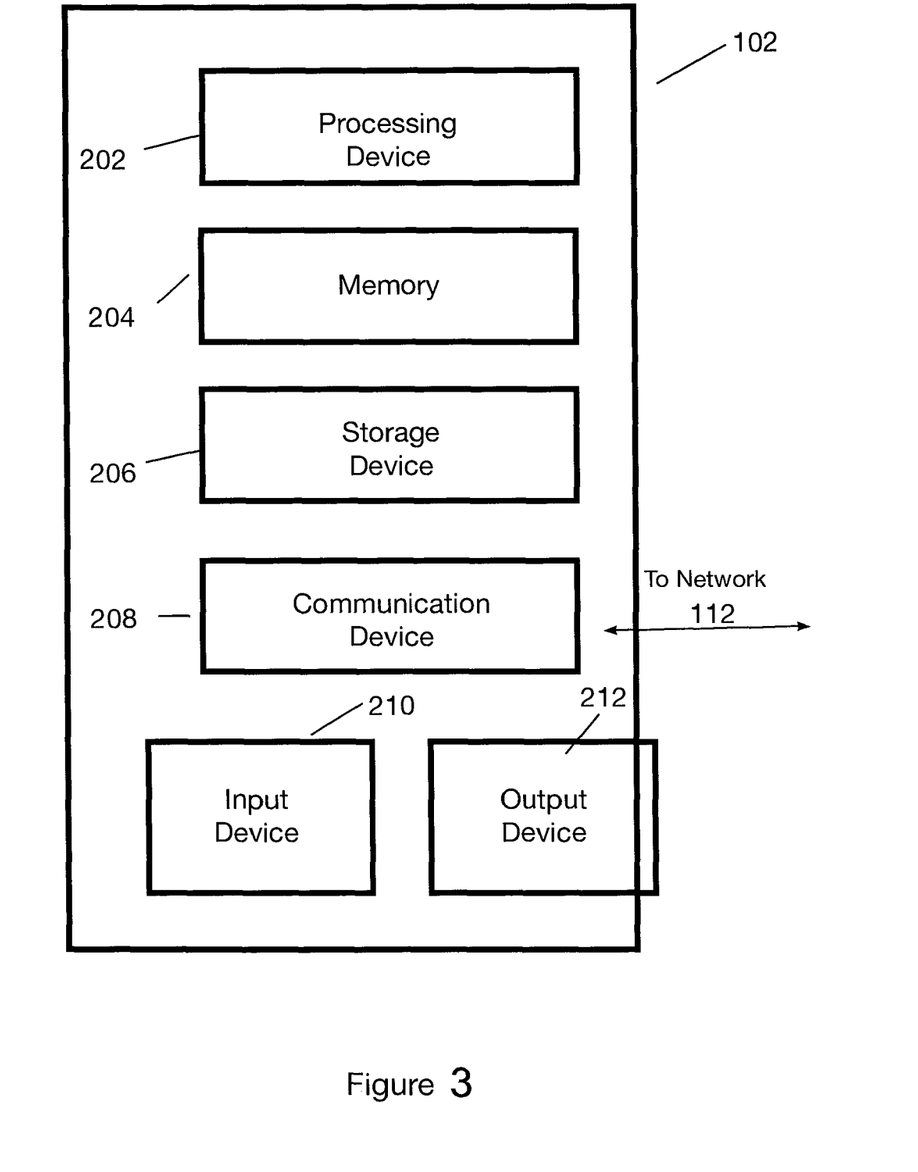
FIG. 3 is a schematic block diagram of an exemplary server of the customized apparel procurement system shown in FIG. 2.

FIG. 3 is a schematic block diagram of an exemplary server 102. Server 102 is a computing system that typically includes a processing device 202, memory 204, a storage device 206, a communication device 208, an input device 210, and an output device 212. In its most basic configuration, server 102 typically includes processing device 202, memory 204, and communication device 208. Other embodiments include other components, such as illustrated in FIG. 3, or yet other components.

Processing device 202 is a device that processes a set of instructions. One example of processing device 202 is a microprocessor. Alternatively, various other processing devices may also be used including central processing units ("CPUs"), microcontrollers, programmable logic devices, field programmable gate arrays, digital signal processing ("DSP") devices, and the like. Processing devices may be of any general variety such as reduced instruction set computing (RISC) devices, complex instruction set computing devices ("CISC"), or specially designed processing devices such as an application-specific integrated circuit ("ASIC") device.

Examples of memory 204 include volatile (such as RAM), and non-volatile (such as ROM and flash) memory. In some embodiments, memory 204 is part of processing device 202, while in other embodiments memory 204 is separate from or in addition to that of processing device 202.

In some embodiments, server 102 also includes an additional storage device 206. Storage device 206 stores digital data. For example, some embodiments of server 102 include removable storage or non-removable storage, including, but not limited to, magnetic or optical disks or tape.

Computer storage media includes volatile and nonvolatile, removable and non-removable media implemented in any method or technology for storage of information such as computer readable instructions, data structures, program modules or other data. Memory 204 and storage device 206 are examples of computer storage media. Computer storage media includes, but is not limited to, RAM, ROM, EEPROM, flash memory or other memory technology, CD- ROM, digital versatile disks (DVD) or other optical storage, magnetic cassettes, magnetic tape, magnetic disk storage or other magnetic storage devices, or any other medium that can be used to store the desired information and that can be accessed by server 102. Any such computer storage media may be part of server 102.

In some embodiments, memory 204 and/or storage device 206 store data instructions including one or more of an operating system, application programs, other program modules, and program data.

Server 102 also includes communication device 208 that allows server 102 to communicate with other devices, such as across network 112 (shown in FIG. 2). Communications device 208 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Examples of communication media include wired media such as a wired network or direct-wired connection, and wireless media such as acoustic, radio frequency, infrared and other wireless media. The term computer readable media as used herein includes both storage media and communication media.

In some embodiments, server 102 includes one or more input devices 210, such as a keyboard, mouse, pen, voice input device, touch input device, or other input device. Some embodiments include one or more output devices 212, such as a display, printer, or other output device.

The computing system described above with reference to server 102 is also an example of other computing systems described herein. For example, in some embodiments imaging computing system 104, designer computing system 106, manufacturing computing system 108, and customer computing system 110 are also computing systems as described above.

Figure 4:
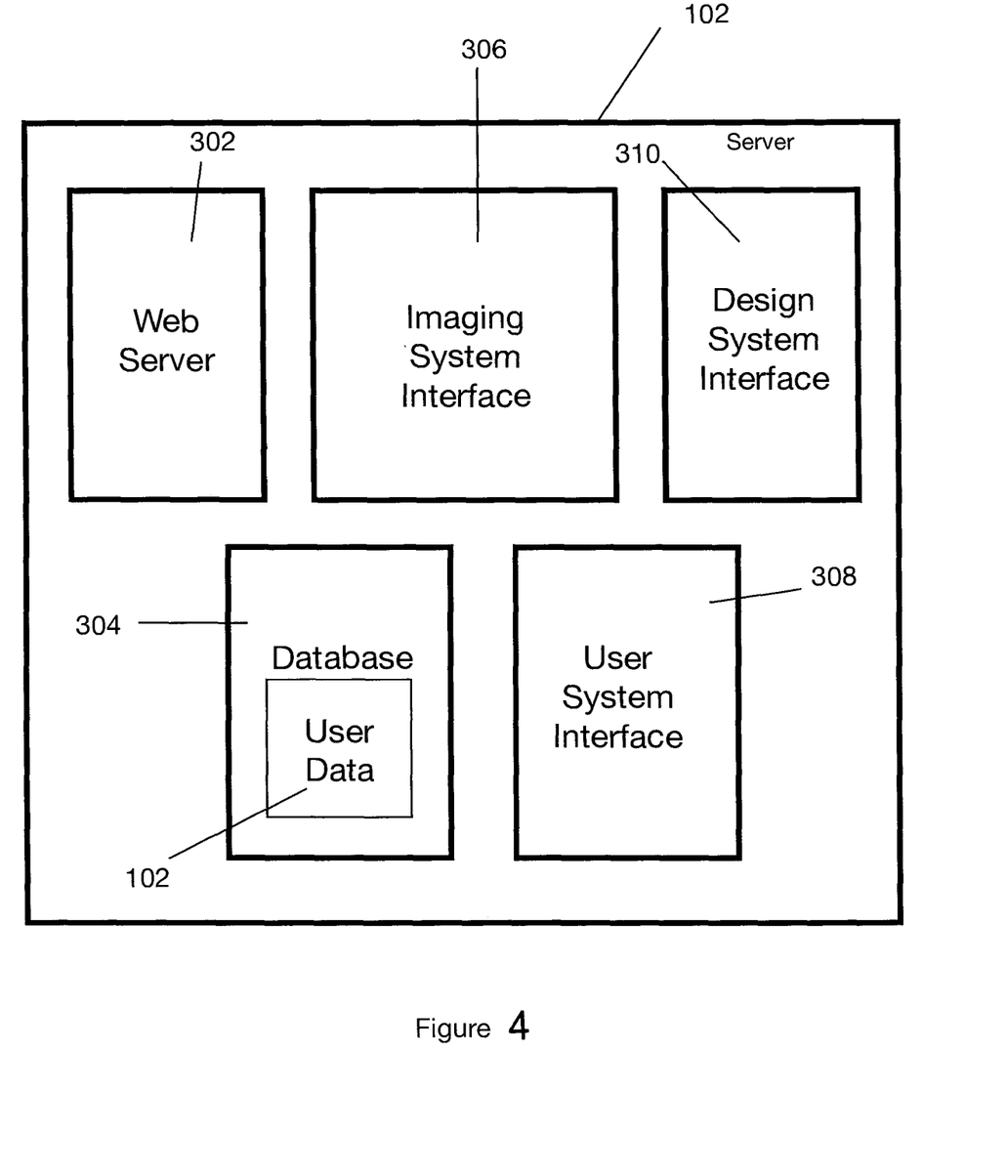
FIG. 4 is a functional block diagram of the server shown in FIG. 3.

FIG. 4 is a functional block diagram of an exemplary server 102. Server 102 includes Web server 302, database 304, designer system interface 306, manufacturing system interface 308, and customer/user system interface 310. Other embodiments include more or fewer features, functions, or modules.

Web server 302 is a computer program that operates to communicate data defining one or more Web pages, such as across network 112 (shown in FIG. 2). Examples of Web server software applications include Internet Information Services from Microsoft Corporation and Apache HTTP Server. In some embodiments Web server operates to receive Hyper Text Transfer Protocol (HTTP) requests from clients (such as systems 104, 106, 108, or 110) and to serve HTTP responses along with data content, such as Web pages formatted in Hypertext Markup Language (HTML).

Database 304 stores user size and image data 120. Customer data 120 is typically associated with a single customer, such that database 304 includes a plurality of customer data records.

In some embodiments server 102 includes separate interface modules for communicating with particular groups of users. For example, server 102 includes administrative system interface 306 for communicating with an administrator (such as through imaging computer system 104), customer system interface 308 for communicating with a customer (such as through customer computing system 110), and a design system interface 310 for communicating with a designer or manufacturer (such as through designer computer system 106 or manufacturing computer hospital system 108). It is sometimes desirable to provide separate interfaces for different groups of users, such as to provide different access rights to each group. For example, a customer using customer computing system 110 is typically limited to accessing his or her own customer data 120, as will a design using a designer computing system 104, while a manufacturer using a manufacturing computing system such as system 108 will typically have access to the customer data of more than one customer and designer data from more than one designer. In some embodiments system interfaces 306, 308, and 310 are custom software applications that control access rights and define particular web pages to be displayed to the associated group. In some embodiments, system interfaces 306, 308, and 310 also define one or more communication protocols and operate to communicate data according to the protocols. For example, in some embodiments some or all communication between server 102 and one or more groups of users occurs through one of system interfaces 306, 308, and 310 rather than through Web server 302. In this way, data is communicated between the user system and server 102 according to a customized or other communication protocol.

Figure 5:
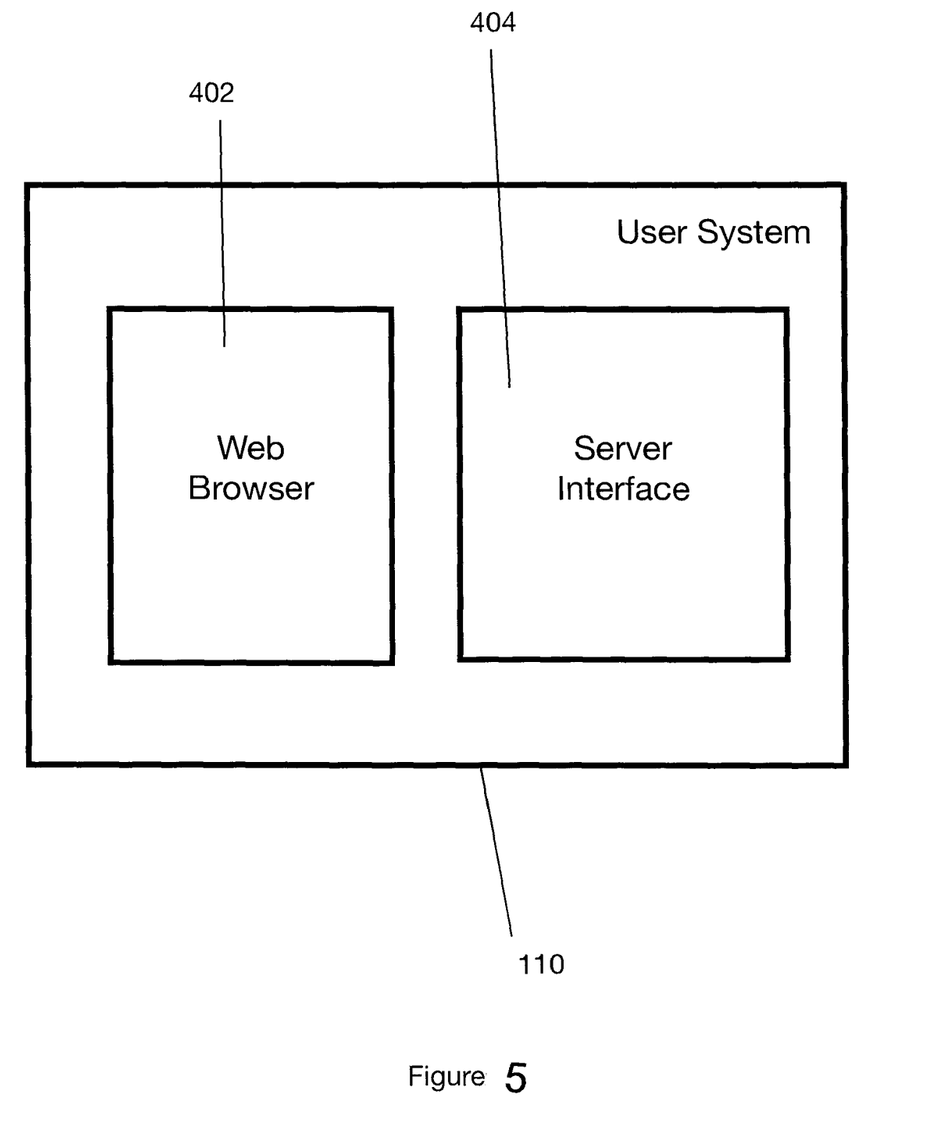
FIG. 5 is a functional block diagram of an exemplary customized apparel procurement system shown in FIG. 2.

FIG. 5 is a functional block diagram of an exemplary customer computing system 110. Customer computing system 110 includes Web browser 402 and server interface 404. Web browser 402 is a software application operating on customer computing system 110 that operates to communicate with Web server 302 (shown in FIG. 3), such as to display Web pages from Web server 302. In some embodiments Web browser operates to send HTTP requests to Web server 302 and to receive HTTP responses along with data content from Web server 302. Examples of Web browser 402 include INTERNET EXPLORER® internet browser by Microsoft Corporation and the FIREFOX® Internet browser by the Mozilla Foundation.

In some embodiments customer computing system 110 includes server interface 404 for communicating with customer system interface 308 (shown in FIG. 4) of server 102. In some embodiments, server interface 404 is a custom software application that defines one or more communication protocols and operates to communicate data according to the protocols.

The system described above with reference to customer computing system 110 is also an example of other systems described herein, such as imaging computer system 104, designer computer system 106, and manufacturing computer system 108. In some embodiments these systems include additional modules. For example, in some embodiments manufacturing computing system 108 includes a manufacturing database interface for accessing data available through a manufacturing intranet or database.

2. Operation of the Preferred Embodiment

Figure 6:
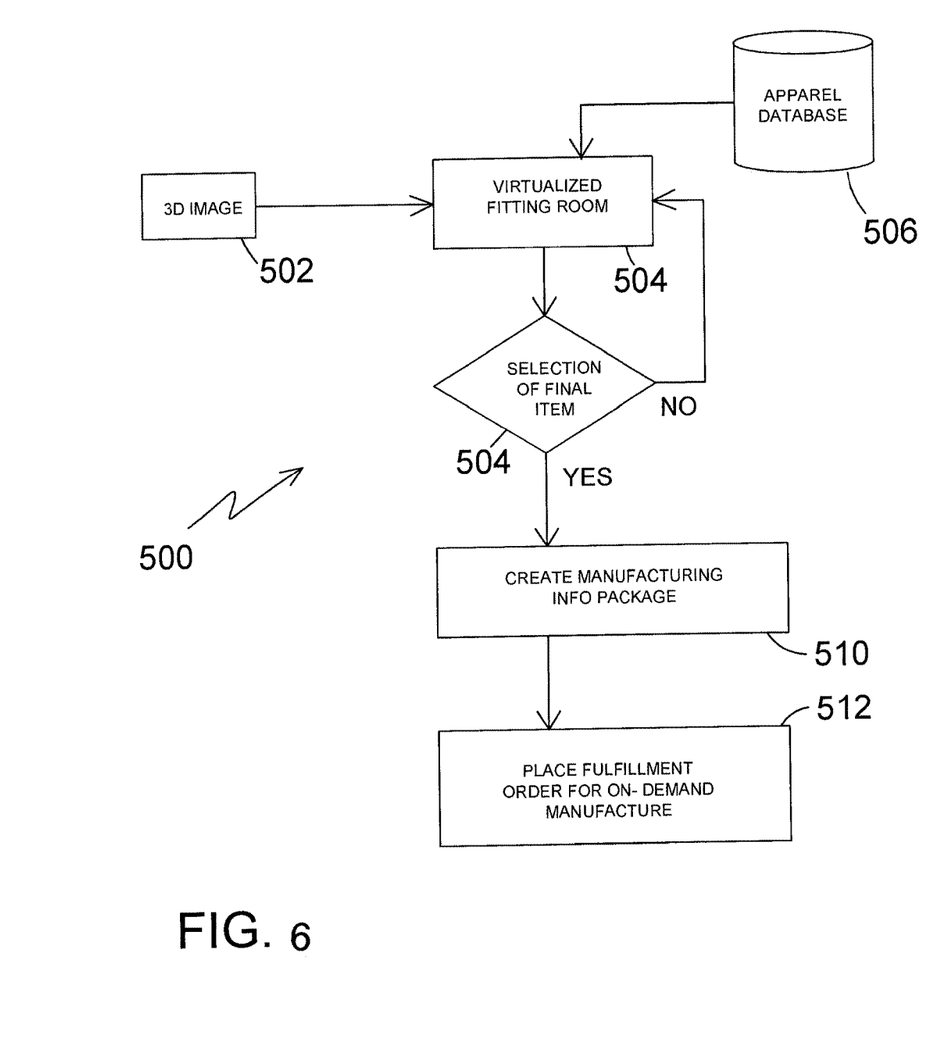
FIG. 6 is a general schematic showing an operation of a customized procurement system according to the present disclosure.
Figure 7:
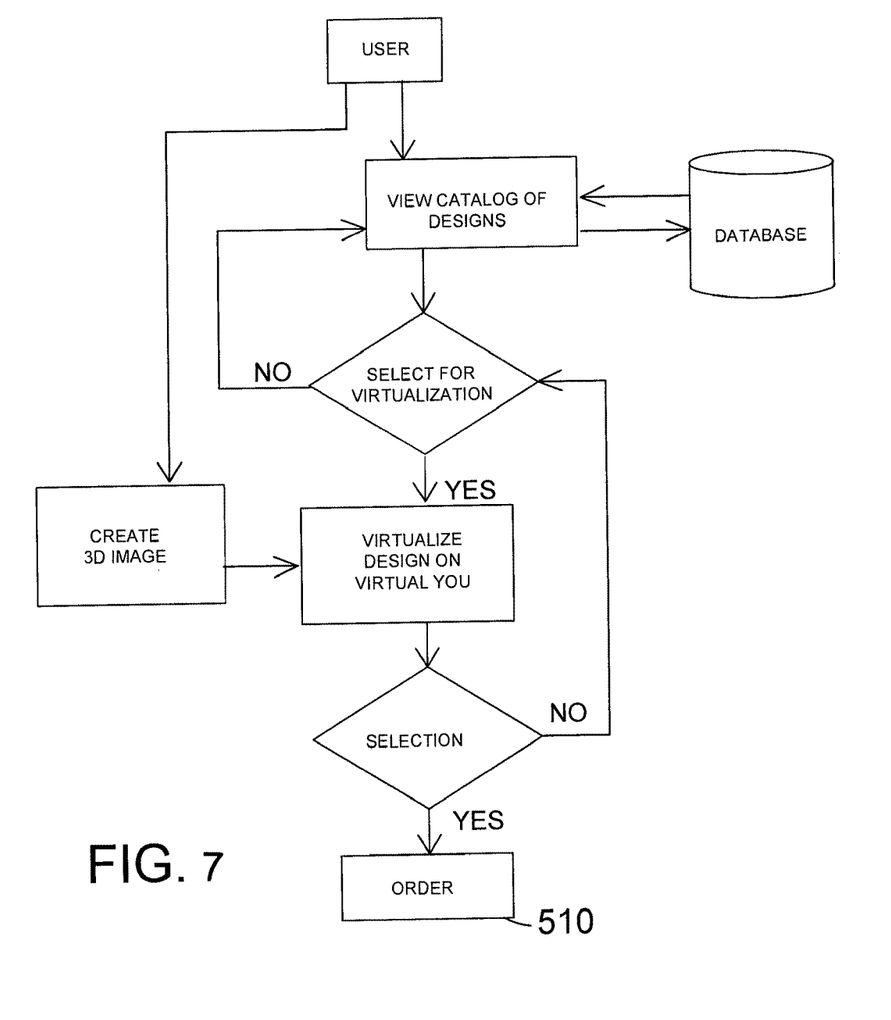
FIG. 7 is a flow chart illustrating an exemplary method of providing a virtual fitting room for use with the customized apparel procurement system according to the present disclosure.
Figure 8:
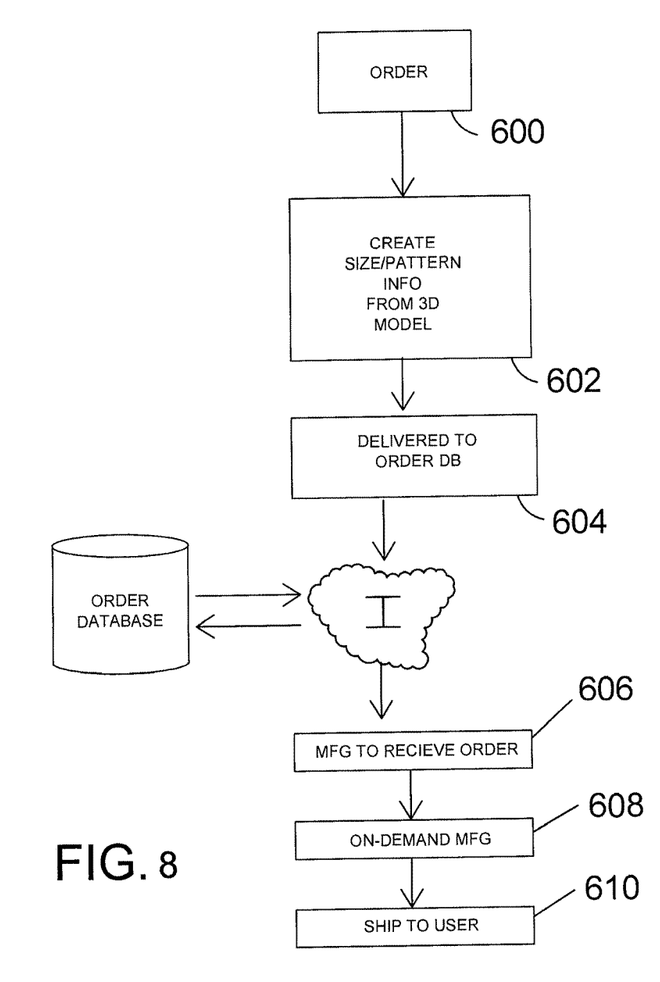
FIG. 8 is a flow chart of a demand-manufacturing method of fulfilment for use with the customized apparel procurement system according to the present invention.

Referring now to FIG. 6 through FIG. 8, an exemplary method 500 of operating a customized apparel procurement system is shown according to the present invention. Method 500 allows for a three-dimensional image 502 of a user that correlates to actual apparel sizing measurements to be used in combination with an apparel database to allow for the creation of an on-line, virtual fitting room 504 to aid the user in a manner that allows the user to make apparel, fashion or clothing purchase decisions.

It is envisioned that a user can utilize the virtual fitting room to shop among various apparel, fashion or clothing designs. By allowing the user to view the design sized to his or her exact body measurements as collected in the "virtual you" image 502, the problems associated with purchasing apparel on-line are greatly reduced. With the user being able to view how the form and fit of the apparel item on them through the "virtual you" image, reductions in returns will be greatly diminished.

Once the users have identified a procurement selection 504, the customer may access the customized apparel procurement system server 102 through the network 112. Access may be directly from an on-line internet website or may be through an intranet network such as through a retail participant. In the exemplary embodiment herein, it is anticipated that access may be obtained through a membership model in which membership status is obtained to allow access to the features, functions, and the benefits of the method 500. While a membership model, either with or without a membership fee, may be utilized to control access, it should be apparent to a person having ordinary skill in the relevant art that the use of membership to control access may be modified, altered or eliminated altogether as obvious variants of the present invention, and as such the use of such a membership model should not be considered limiting of the present invention.

Once access has been obtained, the system can create a manufacturing package including information, inter alia, including that obtained from the virtual you image with his or her body measurements. The acquisition of body measurements data can be obtained through: a body scan from a third-party device; a body scan device of the user's own acquisition; or through non-scanned inputting of self-acquired measurements. If non-scanned measurements are utilized, it is anticipated that the ability to input digital images or photos of the user.

The creation of a visual 3D "Virtual You" of the customer is created utilizing the scanned images, or from the combination of uploaded digital self photo and inputted measurement data. This 3D "Virtual You" image is thereby utilized to implement the "best fit" identification and capture of a customer's unique body dimensions. It is anticipated that the dimensional 3D image is a graphical representation or image of the user that embodies, in a visual manner, the exact body dimension (within a tolerance) information and appears to the user in exact scale to these dimensions. Customization of the apparel item by the user may range from mere modification of small parts of existing designs, all the way through the creation of a completely unique apparel item all together. In conjunction with a simplified design software program that facilitates use by any client online, unique modifications or combinations of designs allow a user to customize their own creation on their "Virtual you", and provide the ability to duplicate any design from a photo online by simply importing the photo into a conversion engine. Such a design may be recreated on the "Virtual You" to the exact measurements where modifications may then be made by the client based on her preferences.

The utilization of the "Virtual You" is used to implement a virtual fitting room that allows for a shopper to visualize the appearance of a selected item of apparel without the need to view themselves while physically wearing the selected item. Apparel and fashion items can then be added to this image in a variety of ways, including advice from consultants or designers available from or through the system 100. It is anticipated that in addition to merely modifying existing apparel and fashion item dimensions, the customer may also be able to manipulate these apparel and fashion item elements to customize the design or otherwise create a derivative design. Further still, it is also anticipated that additional tools may be accessed to allow for the development of completely unique apparel and fashion items as well.

The customer can now preview their own digital 3D image that incorporates additional graphic elements representing the selected, modified or created apparel element or fashion item. Once approved and finalized, this "Virtual You" is updated with additional manufacturing information needed for construction of the selected item including, but not limited to, apparel style information (i.e. size, dimension, cut, fabric, etc.) as well as apparel manufacturing details (i.e. horizontal torso measurement, vertical torso measurements, sleeve measurements, etc.). With this information, the cost of the item can be confirmed, with payment made and submitted, and the order received, confirmed and processed by the system 100.

The system 100 can thereafter transmit the completed manufacturing information to a manufacturing site 600. The necessary information of style, design, dimension, and all other information necessary for manufacturing 604 is delivered to a facility 606 for on-demand manufacturing of a customized and custom sized item 608. A computerized pattern is created to the exact construction specification and the fabric can be cut to exact specification. While it is anticipated that a custom clothing manufacturer capable of receiving individual item orders and implementing on demand manufacturing can be utilized, traditional clothing manufacturing methods may be used. Whether using conventional manufacturing equipment, specialized manufacturing equipment, or a professional tailor, a uniquely sized and designed apparel product may be manufactured immediately upon completion of the sizing and selection process. This provides an optimal fit for the consumer with a production process that carries zero inventory of completed product that can then be packaged and shipped to the customer 610, either directly from the manufacturer, or through a distribution center.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A method for facilitating online retail procurement of apparel, fashion or clothing items comprising:
    virtualizing a user image including:
        scanning, by a scanning device, body dimension information of said user that comprises a scanned body dimension within an accuracy of about 0.5 cm; and
        generating, by an imaging device, a graphical representation or image of the user that embodies, in a visual manner, the scanned body dimension information;
    selecting, from an apparel database that stores a plurality of apparel, fashion or clothing design element information, a specific apparel element along with manufacturing specific metrics selected from an apparel group consisting of: custom tailored apparel that correspond to said scanned body dimensions information of said user; a differently sized specific apparel element that corresponds to a size variation from said scanned body dimensions information of said user; and pre-sized apparel from a predetermined sized of existing inventory;

wherein said manufacturing specific metrics and associated user image are within a tolerance range; and visualizing the user wearing the specific apparel element, including:

creating, on a graphical user interface, a virtualized user image of said graphical representation or image of the user wearing said selected specific apparel element.

2. The method for facilitating online retail procurement of apparel, fashion or clothing items of claim 1, further comprising:

modifying the apparel, fashion or clothing design element information and manufacturing specific metrics of the selected specific apparel elements to incorporate one or more specific apparel alteration; and visualizing the user wearing the altered specific apparel element, including:

creating, on the graphical user interface, the virtualized user image of said graphical representation or image of the user wearing said selected and altered specific apparel element.

3. The method for facilitating online retail procurement of apparel, fashion or clothing items of claim 2, wherein said specific apparel element comprises a pre-sized apparel from a predetermined sized of existing inventory.

4. The method for facilitating online retail procurement of apparel, fashion or clothing items of claim 2, further comprising:

procuring, on an online purchasing network, said selected specific apparel element.

5. The method for facilitating online retail procurement of apparel, fashion or clothing items of claim 4 wherein the procuring, on said online purchasing network, said selected specific apparel element comprises the additional steps of:

transmitting, via an electronic data network, an online procurement order to an online supplier of said pre-sized selected specific apparel element.

6. The method for facilitating online retail procurement of apparel, fashion or clothing items of claim 1, wherein said tolerance range is less than or equal to one inch.

7. The method for facilitating online retail procurement of apparel, fashion or clothing items of claim 1, further comprising:

procuring, on an online purchasing network, said selected specific apparel element.

8. The method for facilitating online retail procurement of apparel, fashion or clothing items of claim 7 wherein the procuring, on said online purchasing network, said selected specific apparel elements comprises:

creating a manufacturing information data set corresponding to said manufacturing specific metrics, said manufacturing information data set includes at least apparel manufacturing details to allow a custom clothing manufacturer to provide a finished product;

transmitting, via an electronic data network, said manufacturing information data set to said custom clothing manufacturer; and wherein said custom clothing manufacturer makes said specific apparel element on demand.

9. The method for facilitating online retail procurement of apparel, fashion or clothing items of claim 7, wherein said manufacturing specific metrics includes information selected from a group consisting of: fabric identifying information selected from a fabric selection database; horizontal torso measurements; vertical torso measurements; sleeve measurements; dimension required to conform to standards from the International Organization for Standardization (ISO); and dimensions require to conform to one or more European Standards (EN) requirements.

10. The method for facilitating online retail procurement of apparel, fashion or clothing items of claim 9, wherein said horizontal torso measurements are selected from a group consisting of: neck circumference; shoulder width; bustline measurements; over-bust circumference; full bust circumference; bust-point separation; under-bust (rib-cage) circumference; natural waist circumference; upper hip circumference; and a lower hip circumference.

11. The method for facilitating online retail procurement of apparel, fashion or clothing items of claim 9, wherein said vertical torso measurements are selected from a group consisting of: back (neck-waist) length; shoulder-waist length; bust-shoulder length; bust-waist length; and two hip-waist lengths.

12. The method for facilitating online retail procurement of apparel, fashion or clothing items of claim 9, wherein said sleeve measurements are selected from a group consisting of: under-arm lengths; over-arm lengths; fore-arm length; wrist circumference; and biceps circumference.

13. The method for facilitating online retail procurement of apparel, fashion or clothing items of claim 1, wherein said plurality of apparel, fashion or clothing design element information is selected from a group consisting of: fit; size; length of arms; length of legs; color of outer fabric; type of outer fabric; color of lining fabric; type of lining fabric; type of lapel; single breasted design; double breasted design; pocket information, including number location and type; selection of buttons; sleeve length; rear jacket vents; pant information, including slim fit, straight leg, wide leg, pockets number and type; and pleat design information.

* * * * *